(12) United States Patent
Panzer et al.

(10) Patent No.: US 11,840,023 B2
(45) Date of Patent: Dec. 12, 2023

(54) MUTLIPHYSICS MODEL FOR INVERSE WARPING OF DATA FILE IN PREPARATION FOR ADDITIVE MANUFACTURING

(71) Applicant: Carbon, Inc., Redwood City, CA (US)

(72) Inventors: Matthew Panzer, Redwood City, CA (US); John R. Tumbleston, Menlo Park, CA (US)

(73) Assignee: Carbon, Inc., Redwood City, CA (US)

( * ) Notice: Subject to any disclaimer, the term of this patent is extended or adjusted under 35 U.S.C. 154(b) by 492 days.

(21) Appl. No.: 16/999,341

(22) Filed: Aug. 21, 2020

(65) Prior Publication Data

US 2021/0060865 A1 Mar. 4, 2021

Related U.S. Application Data

(60) Provisional application No. 62/894,062, filed on Aug. 30, 2019.

(51) Int. Cl.
*B29C 64/393* (2017.01)
*B33Y 50/02* (2015.01)
(Continued)

(52) U.S. Cl.
CPC ............ *B29C 64/393* (2017.08); *B33Y 30/00* (2014.12); *B33Y 50/02* (2014.12); *G06F 30/12* (2020.01);
(Continued)

(58) Field of Classification Search
CPC ....... B29C 64/393; B33Y 30/00; B33Y 50/02; G06F 30/12
(Continued)

(56) References Cited

U.S. PATENT DOCUMENTS 5,236,637 A 8/1993 Hull
5,391,072 A 2/1995 Lawton et al.
(Continued)

FOREIGN PATENT DOCUMENTS

WO 2015195924 A1 12/2015
WO 2016007495 A1 1/2016
(Continued)

OTHER PUBLICATIONS

Türeyen et al. (Development of an Iterative Learning Controller for Polymer based Micro-Stereolithography Prototyping Systems, AACC, 2016, pp. 852-857) (Year: 2016).*
(Continued)

*Primary Examiner* — Iftekhar A Khan
(74) *Attorney, Agent, or Firm* — Myers Bigel, P.A.

(57) ABSTRACT

A method of making a physical object having a desired geometry from a resin such as a dual cure resin by an additive manufacturing process such as a dual cure additive manufacturing process includes (a) entering into a processor a first input geometry for the physical object, the first input geometry corresponding to a desired geometry for the physical object; (b) modifying in the processor the first input geometry to a candidate inversely distorted input geometry for the physical object; (c) generating a simulated object from the candidate inversely distorted input geometry with a Multiphysics model simulation of the additive manufacturing process, the simulated object including distortions towards the desired geometry arising from the additive manufacturing process; (d) evaluating whether the simulated object sufficiently corresponds to the desired geometry for the physical object.

23 Claims, 5 Drawing Sheets

(51) Int. Cl.
*G06F 30/12* (2020.01)
*G06F 30/20* (2020.01)
*B33Y 30/00* (2015.01)
*G06F 113/10* (2020.01)

(52) U.S. Cl.
CPC .......... *G06F 30/20* (2020.01); *G06F 2113/10* (2020.01)

(58) Field of Classification Search
USPC .......................................................... 703/1
See application file for complete search history.

(56) References Cited

U.S. PATENT DOCUMENTS

| | | | |
|---|---|---|---|
| 5,529,473 A | 6/1996 | Lawton et al. | |
| 7,438,846 B2 | 10/2008 | John | |
| 7,892,474 B2 | 2/2011 | Shkolnik et al. | |
| 8,110,135 B2 | 2/2012 | El-Siblani | |
| 8,535,779 B1 | 9/2013 | Varanasi et al. | |
| 8,574,704 B2 | 11/2013 | Smith et al. | |
| 9,205,601 B2* | 12/2015 | DeSimone | G03F 7/0037 |
| 9,211,678 B2* | 12/2015 | DeSimone | B29C 35/0888 |
| 9,216,546 B2* | 12/2015 | DeSimone | B29C 64/40 |
| 9,360,757 B2 | 6/2016 | Desimone et al. | |
| 9,453,142 B2* | 9/2016 | Rolland | C08G 18/8175 |
| 9,498,920 B2 | 11/2016 | Desimone et al. | |
| 9,598,606 B2* | 3/2017 | Rolland | B33Y 50/02 |
| 9,676,963 B2* | 6/2017 | Rolland | G03F 7/027 |
| 10,316,213 B1* | 6/2019 | Arndt | C08G 18/3838 |
| 11,167,375 B2* | 11/2021 | Schiffres | B22F 10/28 |
| 11,179,891 B2* | 11/2021 | Dubelman | B29C 64/124 |
| 11,226,559 B2* | 1/2022 | Chen | G03F 7/029 |
| 11,241,822 B2* | 2/2022 | Pinschmidt, Jr. | C08G 18/10 |
| 11,312,066 B2* | 4/2022 | Ball | B29C 69/02 |
| 11,376,786 B2* | 7/2022 | Feller | B29C 64/245 |
| 11,407,183 B2* | 8/2022 | Price | B29C 65/14 |
| 11,407,890 B2* | 8/2022 | Grover | B33Y 10/00 |
| 11,433,613 B2* | 9/2022 | DeSimone | B29C 64/245 |
| 11,458,673 B2* | 10/2022 | Rolland | B01F 33/848 |
| 11,466,121 B2* | 10/2022 | Gu | B29C 64/124 |
| 11,472,904 B2* | 10/2022 | Robbins | C08K 5/45 |
| 11,479,628 B2* | 10/2022 | Wright | C08G 18/73 |
| 2013/0292862 A1 | 11/2013 | Joyce | |
| 2013/0295212 A1 | 11/2013 | Chen et al. | |
| 2014/0277669 A1* | 9/2014 | Nardi | G06F 30/20 700/103 |
| 2014/0290478 A1 | 10/2014 | Liu et al. | |
| 2016/0046075 A1 | 2/2016 | Desimone et al. | |
| 2016/0193786 A1* | 7/2016 | Moore | B29C 64/135 425/162 |
| 2016/0200052 A1 | 7/2016 | Moore et al. | |
| 2016/0297104 A1* | 10/2016 | Guillemette | B33Y 30/00 |
| 2017/0129169 A1 | 5/2017 | Batchelder et al. | |
| 2017/0173872 A1* | 6/2017 | McCall | B29C 64/124 |
| 2018/0264719 A1* | 9/2018 | Rolland | G03F 7/027 |
| 2018/0329310 A1* | 11/2018 | Coskun | G03F 7/70633 |
| 2018/0370125 A1* | 12/2018 | Rolland | B29C 64/129 |
| 2019/0255771 A1* | 8/2019 | Ilies | B29C 64/241 |
| 2021/0060865 A1* | 3/2021 | Panzer | G06F 30/23 |

FOREIGN PATENT DOCUMENTS

| | | |
|---|---|---|
| WO | 2016123499 A1 | 8/2016 |
| WO | 2016123506 A1 | 8/2016 |
| WO | 2016140886 A1 | 9/2016 |
| WO | 2016149014 A1 | 9/2016 |
| WO | 2016149097 A1 | 9/2016 |

OTHER PUBLICATIONS

Januszieviscz, Rima, et al., "Layerless fabrication with continuous liquid interface production", PNAS, 113(42), 2016, 11703-11708.
Tumbleston, John R., et al., "Continuous liquid interface production of 3D Objects", Science, 347(6228), 2015, 1349-1352.

* cited by examiner

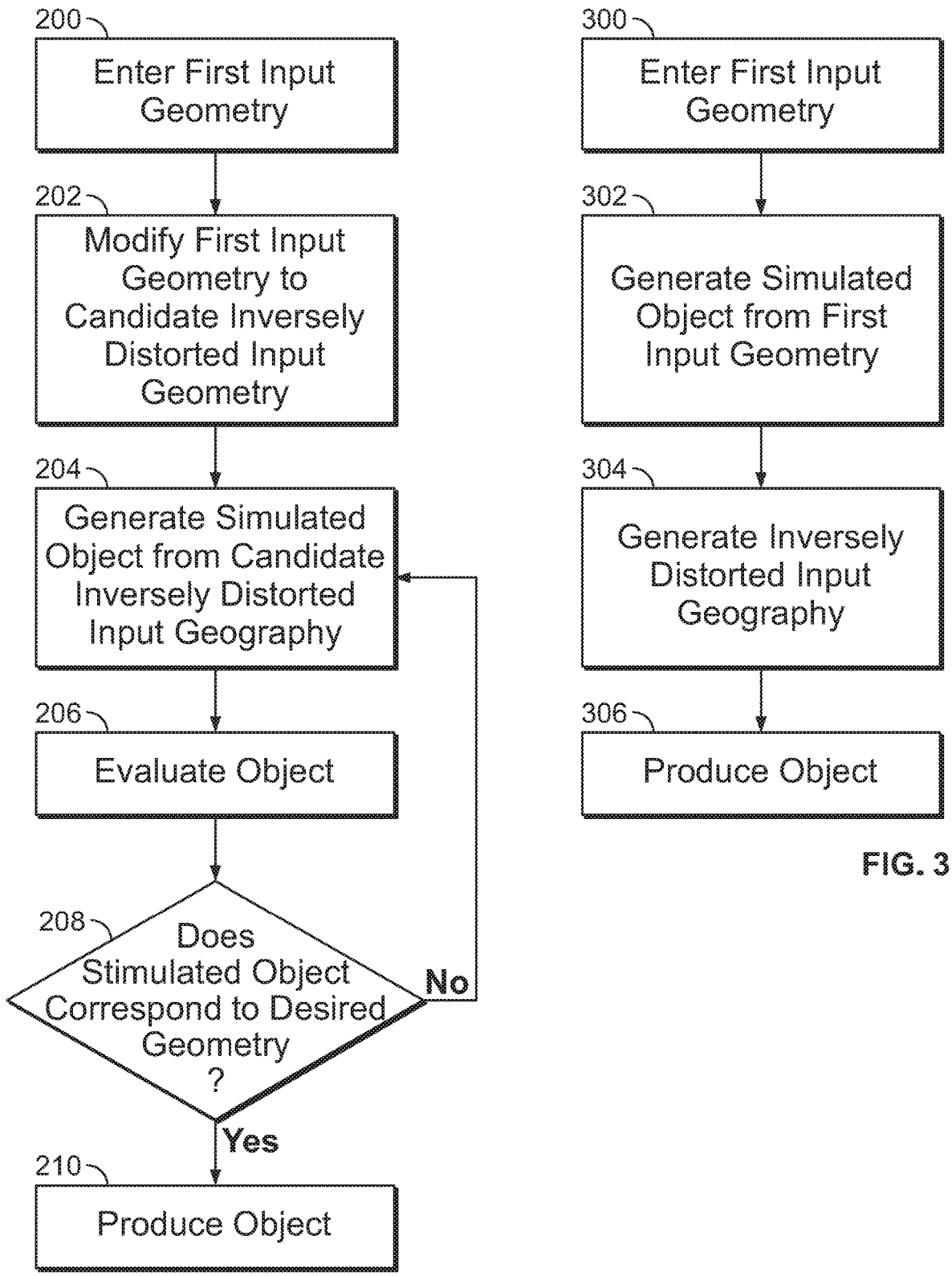

MULTIPHYSICS MODEL FOR INVERSE WARPING OF DATA FILE IN PREPARATION FOR ADDITIVE MANUFACTURING

RELATED APPLICATION

This application claims priority to U.S. Provisional Application Ser. No. 62/894,062, filed Aug. 30, 2019, the disclosure of which is hereby incorporated by reference in its entirety.

FIELD OF THE INVENTION

The present invention concerns additive manufacturing, and more particularly systems and methods for making a physical object having a desired geometry from a resin by an additive manufacturing process using a Multiphyiscs model.

BACKGROUND

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top-down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678, 9,205,601, and 9,216,546 to DeSimone et al.; and also J. Tumbleston, D. Shirvanyants, N. Ermoshkin et al., Continuous liquid interface production of 3D Objects, Science 347, 1349-1352 (2015); see also Rolland et al., U.S. Pat. Nos. 9,676,963, 9,453,142 and 9,598,606.

Part warpage and distortion may occur at various steps during the additive manufacturing process and in post-processing steps, which may adversely impact the accuracy of the object being produced.

SUMMARY

Multiphyics simulation models may be used to reduce distortions in the additive manufacturing process using any suitable resin, including, but not limited to, dual cure resins.

In some embodiments, a method of making a physical object having a desired geometry from a resin such as a dual cure resin by an additive manufacturing process such as a dual cure additive manufacturing process includes (a) entering into a processor a first input geometry for the physical object, the first input geometry corresponding to a desired geometry for said physical object; (b) modifying in the processor the first input geometry to a candidate inversely distorted input geometry for the physical object; (c) generating a simulated object from the candidate inversely distorted input geometry with a Multiphysics model simulation of said additive manufacturing process, the simulated object including distortions towards the desired geometry arising from the additive manufacturing process; (d) evaluating whether said simulated object sufficiently corresponds to the desired geometry for said physical object; (e) optionally repeating steps (c) through (d) with new candidate inversely distorted input geometries (generated from either said first input geometry or a previous candidate inversely distorted input geometry) until an inversely distorted input geometry that generates a simulated object that sufficiently corresponds to the desired geometry is found and selected; and then, optionally, (f) producing the physical object from said resin by said additive manufacturing process with the selected inversely distorted input geometry, said physical object having reduced distortions from the desired geometry as compared to those distortions found in a physical object produced from the same resin by the same additive manufacturing process with said first input geometry.

In some embodiments, distortions in said simulated object include distortion arising from stress variations and/or temperature variations during stereolithographic production of said intermediate object during said additive manufacturing process.

In some embodiments, said distortions in said simulated object include distortions arising from mass loss shrinkage, sagging, stress variations, temperature variations, and/or stress relaxation during cleaning of a stereolithographically produced intermediate object during said additive manufacturing process (wherein said cleaning comprises washing, centrifugal separation (or "spin" cleaning), wiping or blowing, etc., including combinations thereof).

In some embodiments, said distortions in said simulated object include distortions arising from mass loss shrinkage, sagging, and/or stress relaxation during baking of a stereolithographically produced intermediate object during said additive manufacturing process.

In some embodiments, the Multiphysics model simulation comprises a discretized Multiphysics model simulation. In some embodiments, said discretized Multiphysics model simulation comprises a finite element analysis, finite volume analysis, or finite difference analysis Multiphysics model simulation.

In some embodiments, said dual cure resin comprises (i) a light polymerizable first component, and (ii) a second solidifiable component that is different from said first component.

In some embodiments, said second component comprises precursors to a polyurethane, polyurea, or copolymer thereof, a silicone resin, an epoxy resin, a cyanate ester resin, or a natural rubber. In some embodiments, the physical object comprises a polymer blend, interpenetrating polymer network, semi-interpenetrating polymer network, or sequential interpenetrating polymer network formed from said first component and said second component.

In some embodiments, said dual cure additive manufacturing process comprises: (i) a light polymerization step (e.g., in a bottom up or top down stereolithography process); (ii) an optional cleaning step (e.g., by washing, wiping, spinning, etc.), and then (iii) a further curing step (e.g., by heating, microwave irradiating, contacting the second polymerizable component to water; and/or contacting the second polymerizable component to a catalyst).

In some embodiments, the first input geometry and said inversely distorted input geometry each comprise a three dimensional printable file format (e.g., STL format file).

According to some embodiments, a method of making a physical object having a desired geometry from resin such as a dual cure resin by an additive manufacturing process such as a dual cure additive manufacturing process includes (a) entering into a processor a first input geometry for the physical object, the first input geometry corresponding to a desired geometry for said physical object; (b) generating in the processor a simulated object from the first input geometry with a Multiphysics model simulation of said additive manufacturing process, the simulated object including distortions from the desired geometry arising from the additive manufacturing process; (c) generating in the processor an inversely distorted input geometry for the physical object from the simulated object with an inverted representation of said Multiphysics model simulation; and (d) producing the physical object from said resin by said additive manufacturing process with said with said inversely distorted input geometry, said physical object having reduced distortions from the desired geometry as compared to those distortions found in said simulated object (and/or as compared to those distortions found in a physical object produced from the same resin by the same additive manufacturing process with said first input geometry).

According to some embodiments, a method of making a physical object having a desired geometry from a resin such as a dual cure resin by an additive manufacturing process such as a dual cure additive manufacturing process includes (a) entering into a processor a first input geometry for the physical object, the first input geometry corresponding to a desired geometry for said physical object; (b) generating in the processor a candidate inversely distorted input geometry for the physical object; (c) generating a simulated object from the candidate inversely distorted input geometry with a Multiphysics model simulation of said additive manufacturing process, the simulated object including distortions towards the desired geometry arising from the additive manufacturing process; (d) evaluating in the processor, whether said simulated object sufficiently corresponds to the desired geometry for said physical object; (e) optionally repeating steps (b) through (d) with a new candidate inversely distorted input geometries (generated from either said first input geometry or a previous candidate inversely distorted input geometry) until an inversely distorted input geometry that generates a simulated object that sufficiently corresponds to the desired geometry is found and selected; and then (f) producing the physical object from said resin by said additive manufacturing process with the selected inversely distorted input geometry, said physical object having reduced distortions from the desired geometry as compared to those distortions found in a physical object produced from the same resin by the same additive manufacturing process with said first input geometry.

BRIEF DESCRIPTION OF THE DRAWINGS

FIGS. 2-6 are flowcharts illustrating operations according to some embodiments.

DETAILED DESCRIPTION

Figure 1:
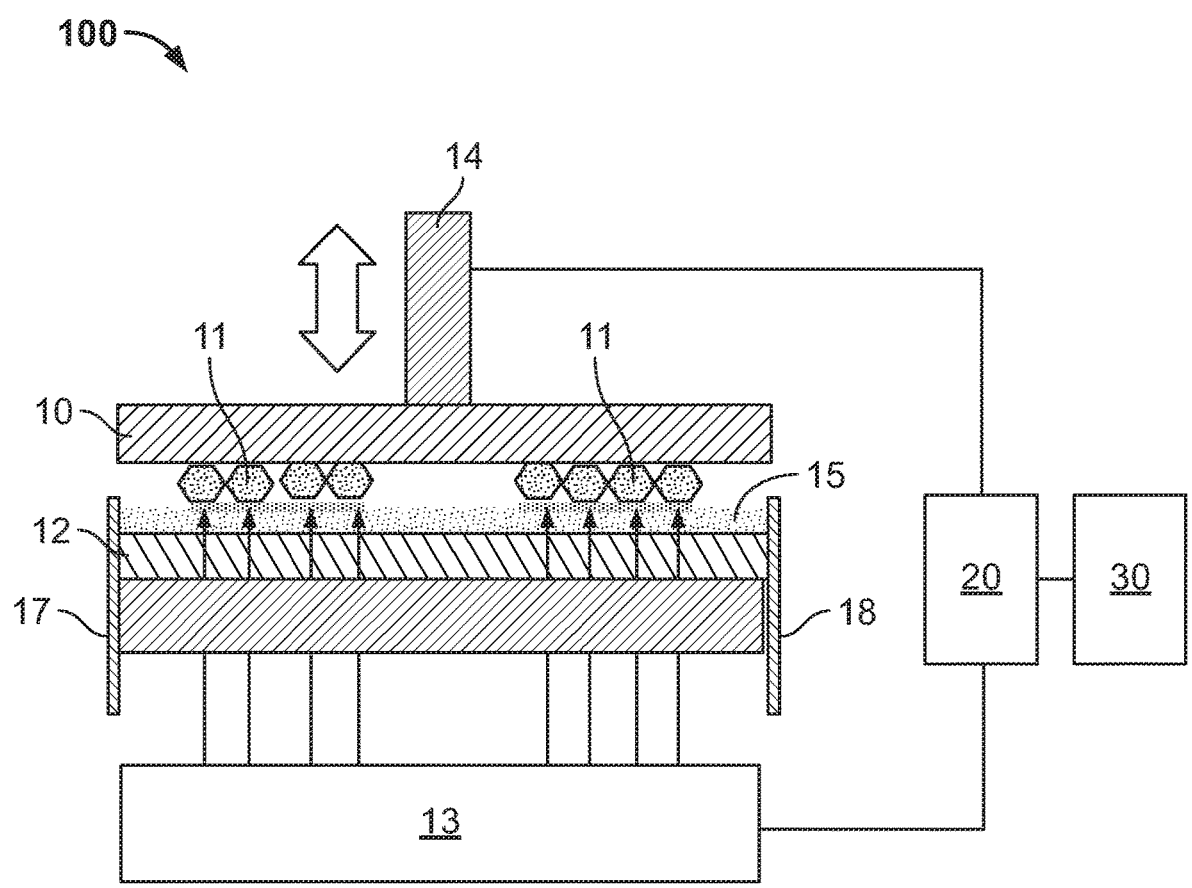
FIG. 1 illustrates an additive manufacturing apparatus for producing a three-dimensional object according to embodiments of the present invention.
Figure 4:
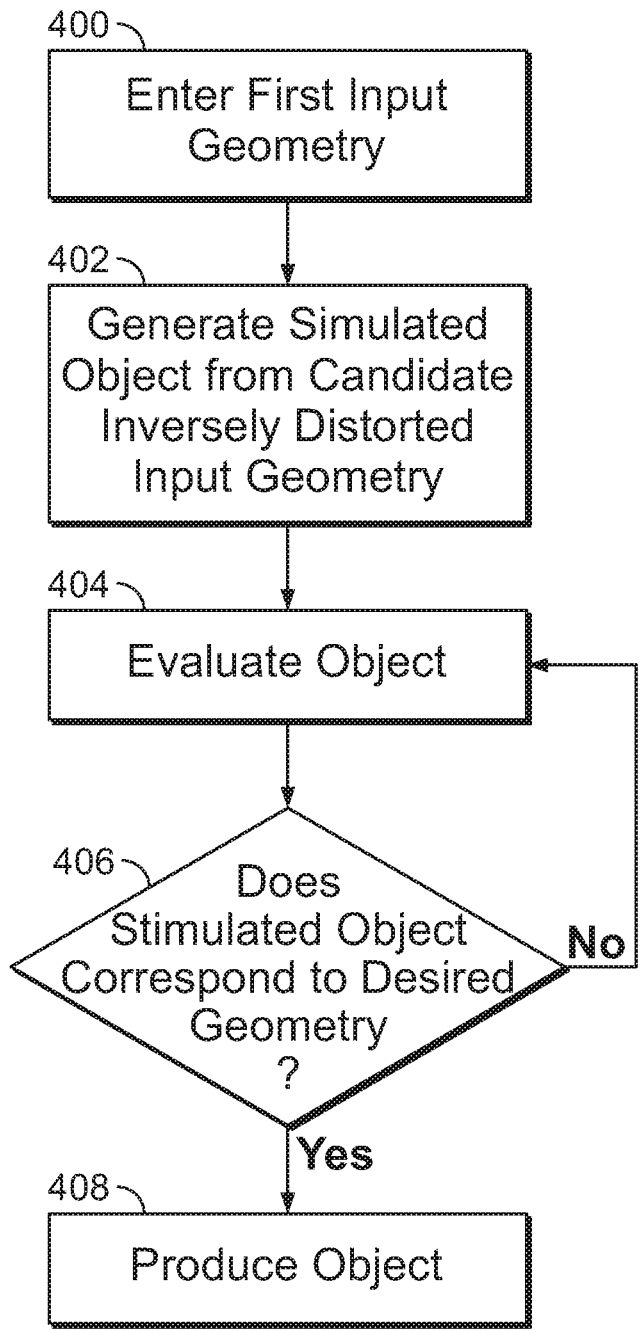

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

1. Additive Manufacturing Methods and Apparatus.

Additive manufacturing apparatus and methods are known. Suitable apparatus includes bottom-up apparatus that employ a window, or optically transparent member or "build plate," on which a pool of polymerizable liquid sits, and through which patterned light is projected to produce a three-dimensional object. Such methods and apparatus are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and U.S. Patent Application Publication No. 2013/0295212 to Chen et al. The disclosures of these patents and applications are incorporated by reference herein in their entirety.

CLIP is known and described in, for example, U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, Science 347, 1349-1352 (published online 16 Mar. 2015). See also R. Janusziewcz et al., Layerless fabrication with continuous liquid interface production, Proc. Natl. Acad. Sci. USA 113, 11703-11708 (Oct. 18, 2016). In some embodiments, CLIP employs features of a bottom-up three-dimensional fabrication as described above, but the the irradiating and/or the advancing steps are carried out while also concurrently maintaining a stable or persistent liquid interface between the growing object and the build surface or window, such as by: (i) continuously maintaining a dead zone of polymerizable liquid in contact with the build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. The particular manner of description is not critical, and the present invention can be used in any of a variety of systems that employ a semipermeable build plate, through which an inhibitor of polymerization passes, whether explicitly referred to as "CLIP" or not.

The apparatus can include a local controller that contains and executes operating instructions for the production of a three-dimensional object on that apparatus, typically from an object data file entered into the controller by the user. Along with the basic three-dimensional image of the object that is typically projected for photopolymerization (along with movement of the carrier and build surface away from one another in the Z direction), the operating instructions can include or generate process parameters such as: light intensity; light exposure duration; inter-exposure duration; speed of production; step height; height and/or duration of upstroke in a stepped or reciprocal operating mode; height and/or duration of downstroke in a reciprocal operating mode; rotation speed for pumping viscous polymerizable liquid; resin heating temperature; and/or resin cooling temperature; rotation speed and frequency, etc. (see, e.g., Ermoshkin et al., Three-dimensional printing with reciprocal feeding of polymerizable liquid PCT Patent Application Publication No. WO 2015/195924 (published 23 Dec. 2015); Sutter et al., Fabrication of three dimensional objects with multiple operating modes, PCT Patent Application Publication No. WO 2016/140886 (published 9 Sep. 2016); J. DeSimone et al., Methods and apparatus for continuous liquid interface production with rotation, PCT Patent Application WO 2016/007495 (published 14 Jan. 2016); see also J. DeSimone et al., U.S. Pat. No. 9,211,678, and J. Batchelder et al., Continuous liquid interface production system with viscosity pump, U.S. Patent Application Publication No. US 2017/0129169 (published 11 May 2017).

In one non-limiting embodiment, the apparatus may be a Carbon Inc., M1 or M2 additive manufacturing apparatus, available from Carbon, Inc., 1089 Mills Way, Redwood City, CA 94063 USA.

In some embodiments, the resin is a dual cure resin, such as a resin comprising at least one light polymerizable constituent, and at least one heat polymerizable constituent (that is a constituent different from the light polymerizable constituent). Such resins are described in, for example, Rolland et al., U.S. Pat. Nos. 9,676,963; 9,598,606; and 9,453,142, the disclosures of which are incorporated herein by reference.

Resins may be in any suitable form, including "one pot" resins and "dual precursor" resins (where cross-reactive constituents are packaged separately and mixed together before use, and which may be identified as an "A" precursor resin and a "B" precursor resin).

Particular examples of suitable resins include, but are not limited to, Carbon, Inc. rigid polyurethane resin (RPU), flexible polyurethane resin (FPU), elastomeric polyurethane resin (EPU), cyanate ester resin (CE), or epoxy resin (EPX), all available from Carbon, Inc., 1089 Mills Way, Redwood City, California 94063 USA.

2. Window Cassettes.

In general, a window cassette or build plate for use in the present invention may comprise any suitable semipermeable or permeable material (that is, permeable to the polymerization inhibitor) including amorphous fluoropolymers, such as an amorphous thermoplastic fluoropolymer like TEFLON AF1600™ or TEFLON AF 2400™ fluoropolymer films, or perfluoropolyether (PFPE), particularly a crosslinked PFPE film, or a crosslinked silicone polymer film. Beneath that may be a fluid bed layer, such as provided by a gas permeable material, optionally containing channels or cavities, such as a permeable polymer (e.g., poly(dimethylsiloxane) (PDMS). A base or support member (such as glass or sapphire) may be included at the bottom of the window if necessary, and may serve to further define the fluid supply bed. The build plate may be supported by a peripheral frame, with the two together forming a removable window cassette as discussed below.

In some embodiments, the pressure and gas supply to the build plate may be controlled to reduce bubble or voids formed by excess gasses, such as nitrogen, in the polymerizable fluid (e.g., resin) of in the 3D printing process and apparatus. Although the methods described herein may be performed by controlling a pressure and/or content of the gas supplied to the build plate using a pressure controller/gas supply, it should be understood that any suitable system may be used, including alternative build plates. For example, any permeable build plate may be positioned such that the side opposite the build surface is in a pressure-controlled chamber, or any suitable configuration of pressure-pressure controlled channels may be used.

The amount and duration of the reduced pressure applied to the polymerizable liquid through the optically transparent member is preferably sufficient to reduce a gas concentration in the polymerizable liquid. The pressure may be at 0%, 5%, 10%, 20%, 25%, 30%, 40% to 50%, 60%, 70%, 80%, 90% or 100% of atmospheric pressure. The oxygen or polymerization inhibitor gas composition of the gas supplied may be 20%, 25%, 30%, 40% to 50%, 60%, 70%, 80%, 90% or 100% oxygen.

In some embodiments, the polymerizable fluid has a gradient of gas concentration, which determines an amount of irradiation or "dose" to cure the polymerizable liquid. For example, the polymerizable fluid can have a lower region on the optically transparent member and an upper region on the lower region opposite the optically transparent member such that the lower region has a higher dose to cure than the upper region. The applied reduced pressure to the polymerizable liquid through the optically transparent member may reduce a gas concentration in the upper region, while maintaining the polymerization inhibitor gas in the lower region, which consequently reduces a thickness of the dead zone. In some embodiments, the thickness of the lower region is less than about 1000 microns or between about 1, 2, 5, 10, 20 50, 100, 200 300 to 400, 500, 600, 700, 800, 900 or 1000 microns.

In some embodiments, oxygen gas may be used as the polymerization inhibitor. Oxygen may be supplied at any suitable pressure, and is preferably supplied at a pressure that is less than atmospheric pressure. In particular embodiments, the pressure of the oxygen is substantial equal to a partial pressure of oxygen in air at atmospheric pressure (e.g., 100% oxygen supplied at about 0.2 atm). The polymerization inhibitor gas may also be substantially devoid of nitrogen or other gases that do not substantially contribute to polymerization inhibition in the dead zone.

Without wishing to be bound by any particular theory, resins that are saturated with gas are prone to degassing when the local pressure drops. Large pressure drops can occur during the build platform movement and resin refill. When the separation of the printed part and window result in gas coalescence, voids may be formed in the printed part. Accordingly, controlling the pressure of a gas or applying a vacuum through the gas permeable build plate may reduce the level of dissolved gases prior to the pressure change and reducing an amount of dissolved gas may increase the pressure differential that the resin can experience prior to void formation. The build plate is permeable to gasses, and equilibrium may be established at the build plate/resin interface relatively quickly. Cycling between air (or oxygen) and vacuum for printing formation and part movement, respectively, may permit the CLIP process to be performed with a maximum pressure differential on the resin prior to void formation the part. Moreover, the removal of nitrogen, which is not an active component of polymerization inhibition, may reduce the overall gas level and further reduce the formation of bubbles or voids in the printed part.

In addition, while oxygen delivery to the interface between the polymerizable fluid and the build plate is desirable, oxygen in the regions of the polymerization fluid that are further away from the interface may lead to a larger dosage of irradiation to cure the polymerizable fluid, which results in a longer exposure time and slower print speeds. Reducing the overall oxygen level may lead to faster cure times, by may lead to difficulty maintaining sufficient oxygen at the interface for the CLIP process to be effective. Moreover, since the light intensity decays as it passes through the polyermization fluid, the percent monomer to polymer conversions may not be constant throughout the exposed region. Controlling a level of oxygen concentration may reduce exposure times and increase print speeds by effectively maintaining a level of oxygen at the build plate and polymerization fluid interface. The oxygen concentration profile may also be controlled to provide more consistent percent monomer to polymer conversions in view of variations of light intensity.

Additional Build Plate Materials. Any suitable material may be used to form the build plates described herein, including multi-layer build plates and/or build plates formed of more than one material. For example, the flexible layer (used alone or with additional supports or layers) may include a woven glass fabric (fiberglass or e-glass) with a crosslinked silicone elastomeric coating (such as room temperature vulcanized (RTV) silicone), which may be lightly infiltrated into the glass fiber fabric to provide mechanical durability. The oxygen permeability of silicone elastomer (rubber) is similar to Teflon® AF-2400. Such a configuration may be used alone or affixed (adhesively adhered) to a glass plate with the unfilled areas of the fabric available for air (oxygen) flow. Sulfonated tetrafluoroethylene based fluoropolymer-copolymers, such as Nation® from Dupont may also be used.

In some embodiments, asymmetric flat sheet membranes which are currently used in very high quantity for water purification applications (see U.S. Patent Publication No. 2014/0290478) may be used. These membranes are generally polysulfone or polyethersulfone, and may be coated with perfluoropolymers or crosslinked silicone elastomer to increase chemical resistance. Also poly(vinylidene fluoride) and possibly polyimide asymmetric (porous) membranes may be used, for example, if chemical resistance is a problem. Some of the membranes may be used as is without coatings. Examples of such membranes include FilmTec® membranes (Dow Chemical, Midland, Michigan (USA)). These are porous polysulfone asymmetric membranes coated with a crosslinked high Tg polyamide (with a coating thickness of about 0.1 microns). The crosslinked polyamide coating should provide chemical resistance. Although the oxygen permeability of the polyamide is low, the thickness of the coating may be so low that the effective oxygen transmission rate is high. The polysulfone support without the polyamide layer could be coated with a wide variety of polymers such as silicone rubber (or AF-2400) to yield very high oxygen transmission. The FilmTec® membranes are produced in very high quantity as they are the prime material used in water desalination plants. PVDF porous membranes may allow repeated use.

Although embodiments according to the present invention are described with respect to flexible layers on the build plate that include a semipermeable (or gas permeable) member (e.g., perfluoropolymers, such as TEFLON AF® fluoropolymers, it should be understood that any suitable flexible material may be used in the configurations described herein. For example, a transparent, resilient paper, such as glassine, may be used. Glassine is a relatively transparent, greaseproof paper formed of well-hydrated cellulosic fibers that has been super calendared. Glassine may be plasticized and/or coated with wax or a glaze. Glassine may be gas permeable. In some embodiments, the glassine may be coated with a thin layer of crosslinked silicone elastomer or a perfluoropolymer, such as TEFLON AF® fluoropolymers. Glassine paper is substantially grease resistant, and may have limited adhesion to the polymerizable liquid described herein.

Build plate coatings. Omniphobic surfaces may be used on the build plate surface or build region. For example, patterned surfaces (either a random array of particles or micro-patterned surfaces) that contain non-miscible fluids that are pinned or held to the surface by capillary forces may be used. Such a surface may result in fluid on the surface floating along the surface. Examples of such surfaces are described in U.S. Pat. Nos. 8,535,779 and 8,574,704, the disclosures of which are hereby incorporated by reference in their entireties.

Examples of build plates that can be modified based on the disclosure given herein for use in carrying out the present invention include, but are not limited to, those described in: U.S. Pat. No. 9,498,920 to J. DeSimone, A. Ermoshkin, and E. Samulski; U.S. Pat. No. 9,360,757 to J. DeSimone, A. Ermoshkin, N. Ermoshkin and E. Samulski; and U.S. Pat. No. 9,205,601 to J. DeSimone, A. Ermoshkin, N. Ermoshkin and E. Samulski; U.S. Patent Application Publication Nos. 2016/0046075 to J. DeSimone, A. Ermoshkin et al.; 2016/0193786 to D. Moore, A. Ermoshkin et al.; 2016/0200052 to D. Moore, J. Tumbleston et al.; PCT Patent Application Publication Nos. WO 2016/123499 to D. Moore, J. Tumbleston et al; WO 2016/123506 to D. Moore, J. Tumbleston et al.; WO 2016/149097 to J. Tumbleston, E. Samulski et al.; WO 2016/149014 to J. Tumbleston, E. Samulski et al.; and others (the disclosures of all of which are incorporated by reference herein in their entirety).

3. Example Products and Methods.

In general, embodiments of the present invention provide an additive manufacturing apparatus and resin window cassette for an additive manufacturing apparatus. Related methods of reducing warpage using a Multiphysics model are also provided. Embodiments of the present invention will now be discussed in greater detail with reference to FIGS. 1-6.

Referring to FIG. 1, an additive manufacturing apparatus 100 according to embodiments of the present invention is illustrated. As shown in FIG. 1, the apparatus 100 may include a deck 17, a resin cassette 12 positioned on the deck 17, a light engine 13 (e.g., a UV light source) positioned beneath the deck 17, a drive assembly 14, and a carrier platform 10 positioned above the cassette 12. The carrier platform 10 may be positioned above the light engine 13. The drive assembly 14 may be operatively associated and/or connected with the deck 17 and carrier platform 10. The drive assembly 14 may be configured to advance the carrier platform 10 towards and away from the cassette 12. As will discussed in further detail below, objects 11 may be produced on the carrier platform 10 from resin 15.

In some embodiments, the additive manufacturing apparatus 100 of the present invention may further comprise control and analysis software, such as a controller 20 and a design tool or Multiphysics object simulator 30. The controller 20 and the simulator 30 may be operatively associated with the light engine 13 and the drive assembly 14. The controller 20 and the simulator 30 may be provided on the same or different processors/locations, and the controller 20 and the simulator 30 may be local, remote (e.g., on the cloud), or distributed across both local and remote locations. Moreover, in some embodiments, functions described herein as being performed by the simulator 30 may be performed by the controller 20, or functions described as being performed by the controller 20 may be performed by the simulator 30. Thus, the functions and steps described herein may be performed by any suitable combination of elements or processor.

The controller 20 and simulator 30 may include a processor or circuits configured to carry out some embodiments of the invention. In some embodiments, a physical object having a desired geometry may be made from a dual cure resin by a dual cure additive manufacturing process utilizing a Multiphysics model stimulation.

Forward/Iterative Approach as a Design Tool.

In some embodiments, methods, systems and/or computer products may be provided to implement a forward/iterative approach as a design tool for making a physical object having a desired geometry from a dual cure resin by a dual cure additive manufacturing process.

As shown in FIG. 2, a first input geometry for a physical object to be made from a dual cure resin by a dual cure additive manufacturing process is entered into a processor, such as the simulator 30 (Block 200). The first input geometry may be entered by a user or may be entered by pre-programmed software or may be entered by any suitable method. The first input geometry corresponds to a desired geometry for the physical object.

The first input geometry is modified to a candidate inversely distorted input geometry for the physical object by the simulator 30 (Block 202). In some embodiments, the simulator 30 includes a design tool in which the user can manipulate shapes. The user may stretch or bend shapes, add or remove features or intra part supports, and/or manually stretch or bend shapes on a user interface or display in the design tool to provide the inversely distorted input geometry. Removeable support struts may be added between locations in the same part strategically to minimize warping, and then the support struts may be removed post processing. In some embodiments, the simulator 30 may be configured to provide a candidate inversely distorted input geometry based on the user input.

A simulated object may be generated by the simulator 30 from the candidate inversely distorted input geometry with a Multiphysics model simulation of an additive manufacturing process (Block 204). The simulated object may include including distortions towards the desired geometry arising from the additive manufacturing process. The additive manufacturing process may include the processes described herein.

The simulated object may be evaluated to determine if it sufficiently corresponds to the desired geometry for the physical object (Block 206). The simulator 30 may include a design tool that facilitates a user mental assessment to determine if the simulated object sufficiently corresponds to the desired geometry of the physical object, such as with a visual aid, such as a grid projected on a display screen or by overlaying the simulated object on the desired object on a display screen. In some embodiments, a quantitative merit function can be used to measure the difference between the simulated object and the desired object with or without additional input from a user.

In some embodiments, the steps at Blocks 204 and 206 are optionally repeated with one or more new candidate inversely distorted input geometries if the difference between the simulated object and the desired object do not meet a minimum threshold or are not considered to be sufficiently close (Block 208). The new candidate geometries may be generated from either the first input geometry or a previous candidate inversely distorted input geometry until an inversely distorted input geometry that generates a simulated object that sufficiently corresponds to the desired geometry is found and selected.

The physical object is optionally produced from a dual cure resin by a dual cure additive manufacturing process with the selected inversely distorted input geometry (Block 210). The physical object has reduced distortions from the desired geometry as compared to those distortions found in a physical object produced from the same dual cure resin by the same dual cure additive manufacturing process with the first input geometry.

Inverted Approach as a Design Tool.

In some embodiments, an inverted approach may be used as a design tool for methods, systems and/or computer program products for making a physical object having a desired geometry from a dual cure resin by a dual cure additive manufacturing process.

In some embodiments, a first input geometry for the physical object is input into a processor, such as the simulator 30 (Block 300). The first input geometry corresponds to a desired geometry for said physical object.

The simulator 30 generates a simulated object from the first input geometry with a Multiphysics model simulation of the additive manufacturing process (Block 302). The simulated object includes distortions from the desired geometry arising from the additive manufacturing process.

The simulator may generate an inversely distorted input geometry for the physical object from the simulated object with an inverted representation of the Multiphysics model simulation (Block 304).

The physical object may be produced from a dual cure resin by a dual cure additive manufacturing process with the inversely distorted input geometry (Block 306). The physical object has reduced distortions from the desired geometry as compared to those distortions found in the simulated object (and/or as compared to those distortions found in a physical object produced from the same dual cure resin by the same dual cure additive manufacturing process with said first input geometry).

Forward/Iterative Approach, Automated.

In some embodiments, a forward/iterative approach may be used in methods, systems and/or computer program products for making a physical object having a desired geometry from a dual cure resin by a dual cure additive manufacturing process.

A first input geometry for the physical object may be entered into a processor, such as the simulator 30 (Block 400). The first input geometry may correspond to a desired geometry for said physical object. The simulator 30 may generate a candidate inversely distorted input geometry for the physical object. The candidate inversely distorted input geometry may be generated by any suitable technique. In some embodiments, the regions of the geometry are perturbed "un intelligently" one at a time, and the perturbations that improve the quality are kept. In some embodiments, a library can be built from previous parts and analysis, and the library may be used by the simulator 30 to more intelligently choose the geometry perturbation. The simulator 30 may look for similar geometries in the past and tries those deformations to find perturbations that improve quality, which are kept. In some embodiments, a simpler Multiphysics model is created that can be easily "inverted" using the inverted approach, which is then used to generate candidate inversely distorted input geometries at the initial perturbations. In some embodiments, the geometry is parameterized, and the gradients of the model are used with respect to the parameters to compute a candidate inversely distorted input geometry. This may be done through an "Adjoint" approach or gradient optimization approach.

A simulated object is generated by the simulator 30 from the candidate inversely distorted input geometry with a Multiphysics model simulation of the additive manufacturing process (Block 402). The simulated object includes distortions towards the desired geometry arising from the additive manufacturing process.

The simulator 30 evaluates whether the simulated object sufficiently corresponds to the desired geometry for the physical object (Block 404). This evaluation may be performed by the simulator 30 by creating a merit function, which is a function that uses the two geometries to calculate a value that captures how different the two geometries are, such that the value is either a minimum or maximum when the geometries are identical. The simulator 30 iterates until this value is extremized. Examples of merit functions include the sum of the mean square distances, the log-likelihood functions, etc.

In some embodiments, the simulator 30 repeats the steps at Blocks 402 and 404 with a new candidate inversely distorted input geometries (Block 406), which may be generated from either the first input geometry or a previous candidate inversely distorted input geometry, until an inversely distorted input geometry that generates a simulated object that sufficiently corresponds to the desired geometry is found and selected.

The physical object may be produced from said dual cure resin by said dual cure additive manufacturing process with the selected inversely distorted input geometry (Block 408). The physical object has reduced distortions from the desired geometry as compared to those distortions found in a physical object produced from the same dual cure resin by the same dual cure additive manufacturing process with said first input geometry.

It should be understood that in any of the above approaches, the distortions in the simulated object include distortion arising from stress variations and/or temperature variations during stereolithographic production of said intermediate object during said additive manufacturing process. The distortions in the simulated object may include distortions arising from mass loss shrinkage, sagging, stress variations, temperature variations, and/or stress relaxation during cleaning of a stereolithographically produced intermediate object during the additive manufacturing process. The cleaning process generally includes washing, centrifugal separation (or "spin" cleaning), wiping or blowing, etc., including combinations thereof. The distortions in the simulated object may include distortions arising from mass loss shrinkage, sagging, and/or stress relaxation during baking of a stereolithographically produced intermediate object during said additive manufacturing process.

In any of the above approaches, the Multiphysics model simulation may include a discretized Multiphysics model simulation. The discretized Multiphysics model simulation may include a finite element analysis, finite volume analysis, or finite difference analysis Multiphysics model simulation.

In any of the above approaches, the dual cure resin may include (i) a light polymerizable first component, and (ii) a second solidifiable component that is different from said first component. In some embodiments, the second component includes precursors to a polyurethane, polyurea, or copolymer thereof, a silicone resin, an epoxy resin, a cyanate ester resin, or a natural rubber. In some embodiments, the physical object includes a polymer blend, interpenetrating polymer network, semi-interpenetrating polymer network, or sequential interpenetrating polymer network formed from the first component and the second component. In some embodiments, the dual cure additive manufacturing process comprises: (i) a light polymerization step (e.g., in a bottom up or top down stereolithography process); (ii) an optional cleaning step (e.g., by washing, wiping, spinning, etc.), and then (iii) a further curing step (e.g., by heating, microwave irradiating, contacting the second polymerizable component to water; and/or contacting the second polymerizable component to a catalyst).

In addition, the first input geometry and the inversely distorted input geometry described herein may each include a three dimensional printable file format (e.g., STL format file).

Although embodiments according to the present invention are described herein with respect to dual cure resins, it should be understood that any suitable resin and additive manufacturing process may be used, including single cure resins.

EXAMPLES

Figure 5:
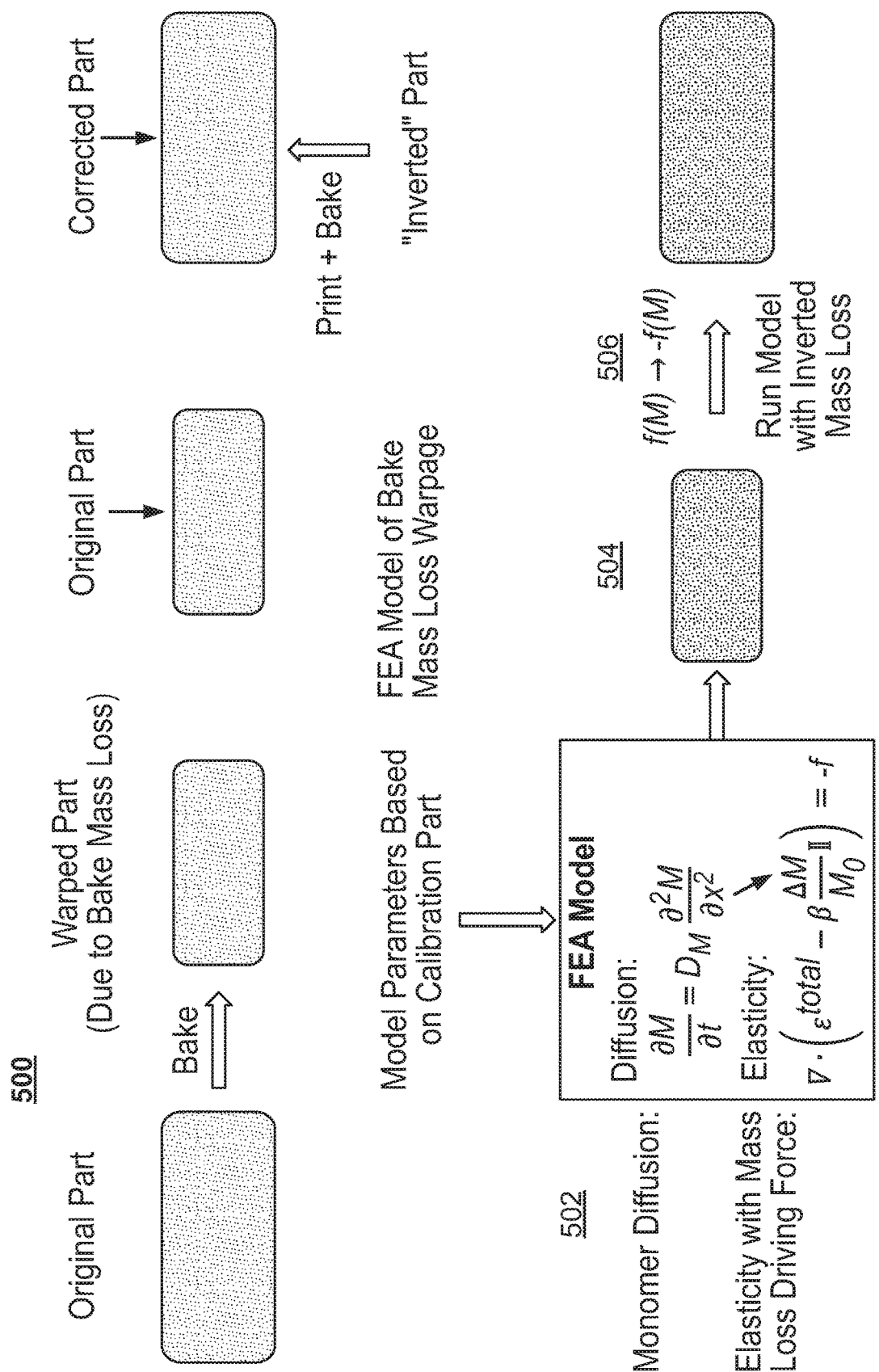

As illustrated in FIG. 5, an original part of object is baked (step 500) and is warped due to bake loss. Model parameters based on a calibration part are input to a simulator or FEA model (step 502), which performs a model of bake loss warpage (step 504). The model is run with inverted mass loss to provide the inverted part (step 506).

Figure 6:
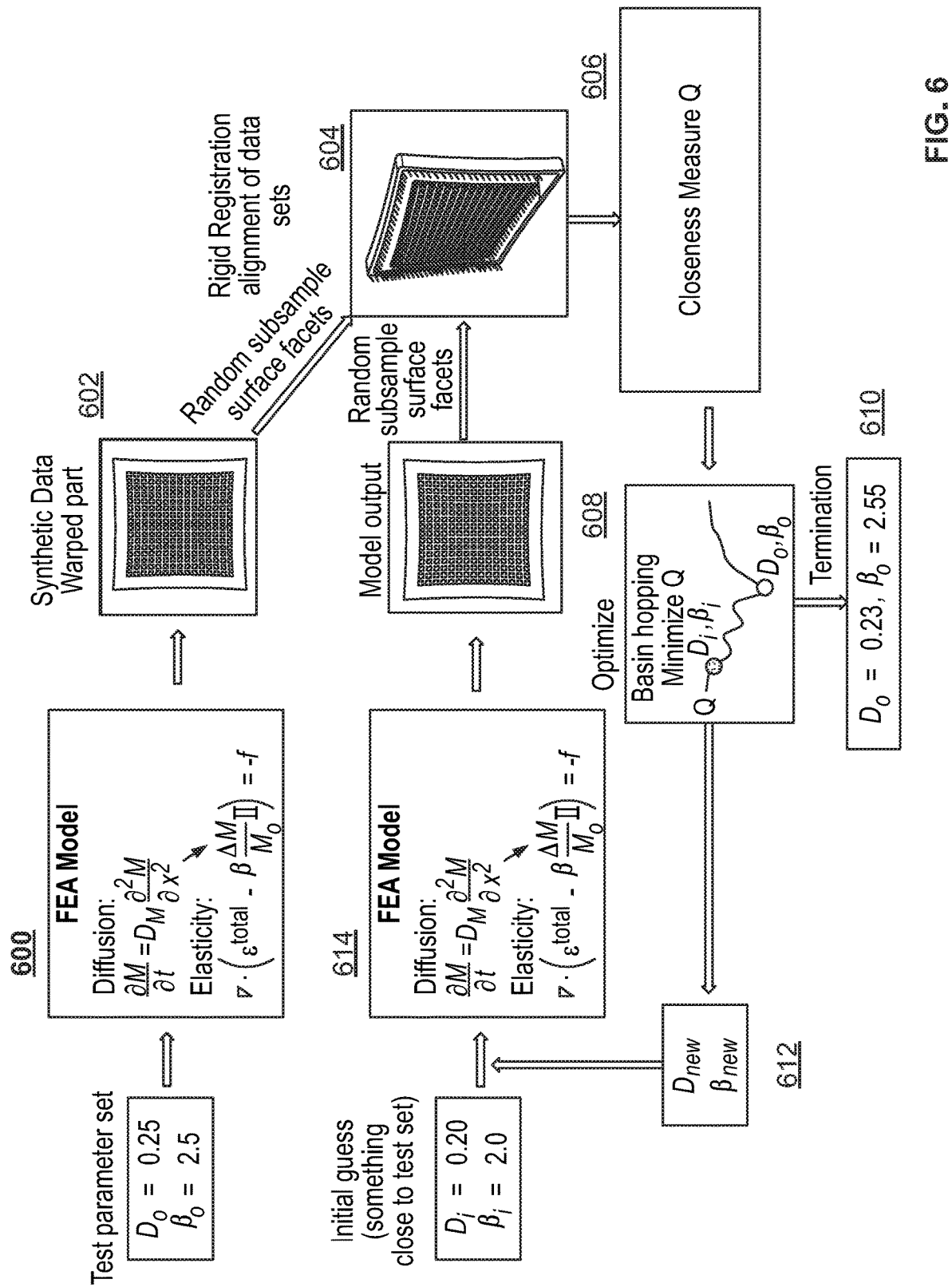

As illustrated in FIG. 6, test parameters are input into an FEA model (step 600), which outputs synthetic data of a warped part (step 602). The FEA Model may be expressed as follows, using exemplary values for $D_0$ and $\beta_0$:

$$D_0 = 0.25$$

$$\beta_0 = 2.5$$

$$\text{Diffusion: } \frac{\partial M}{\partial t} = D_M \frac{\partial^2 M}{\partial x^2}$$

$$\text{Elasticity: } \nabla \cdot \left( \epsilon^{total} - \beta \frac{\Delta M}{M_0} II \right) = -f$$

The synthetic data warped part is evaluated using a rigid registration alignment of data sets (step 604), and a closeness measure is performed (step 606). The closeness measure Q may be calculated as follows:

$$Q(R, t, s, \sigma^2) = \frac{1}{2\sigma^2} \sum_{m,n=1}^{M,N} P^{old}(m \mid x_n) \|x_n - sRy_m - t\|^2 + \frac{N_P D}{2} \log \sigma^2,$$

$$\text{s.t } R^T R = I, \det(R) = 1$$

The closeness measurement is used to optimize the closeness (or reduce warpage) (step 608). The minimized Q may be based on "basin hopping" values for $D_i$ and $\beta_i$. If the closeness measurement is sufficiently optimized, then the process is terminated for $D_0$ and $\beta_0$. (step 610), which is illustrated for example modified termination values for $D_0$ and $\beta_0$. If additional optimization is desired, then new input values $D_{new}$ and $\beta_{new}$ are chosen based on the optimization (step 612) and used as input into the FEA model (step 614). The FEA model in step 614 may be the same as that used at step 606. Once parameters are chosen to reduce warpage, the object may be made according to a dual cure process as described herein.

Although the above examples are given with a finite element analysis model (FEA), it should be understood that any Multiphysics simulation may be used.

Thus, the input geometry may be modified iteratively until the input geometry corresponds sufficiently to the desired geometry of the object. Although specific closeness measure equations and FEA model equations are provided, it should be understood that any suitable Multiphysics modeling equation may be used.

It will be understood that various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, steps, operations, elements components and/or groups or combinations thereof, but do not preclude the presence or addition of one or more other features, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the Figures are schematic in nature and their shapes are not intended to illustrate the actual shape of a region of a device and are not intended to limit the scope of the inventive subject matter.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of making a physical object having a desired geometry from a dual cure resin by a dual cure additive manufacturing process, the method comprising:
   (a) entering into a processor a first input geometry for the physical object, the first input geometry corresponding to a desired geometry for said physical object;
   (b) modifying in the processor the first input geometry to a candidate input geometry that is distorted inversely to distortions from the desired geometry caused by the additive manufacturing process for the physical object;
   (c) generating a simulated object from the candidate input geometry with a Multiphysics model simulation of said additive manufacturing process, the simulated object including distortions towards the desired geometry arising from the additive manufacturing process;
   (d) evaluating whether said simulated object sufficiently corresponds to the desired geometry for said physical object based on a user assessment and/or a minimum threshold of a function configured to measure a difference between said simulated object and said desired geometry; and
   (e) repeating steps (c) through (d) with new candidate input geometries that are distorted inversely to distortions from the desired geometry caused by the additive manufacturing process and generated from either said first input geometry or a previous candidate input geometry until one of the candidate input geometries that generates a simulated object that sufficiently corresponds to the desired geometry is found and selected.

2. The method of claim 1, further comprising:
   (f) after repeating steps (c) through (d), producing the physical object from said dual cure resin by said dual cure additive manufacturing process with the selected one of the candidate input geometries, said physical object having reduced distortions from the desired geometry as compared to those distortions found in a physical object produced from the same dual cure resin by the same dual cure additive manufacturing process with said first input geometry.

3. The method of claim 1, wherein said distortions in said simulated object include distortion arising from stress variations and/or temperature variations during stereolithographic production of said intermediate object during said additive manufacturing process.

4. The method of claim 1, wherein said distortions in said simulated object include distortions arising from mass loss shrinkage, sagging, stress variations, temperature variations, and/or stress relaxation during cleaning of a stereolithographically produced intermediate object during said additive manufacturing process (wherein said cleaning comprises washing, centrifugal separation (or "spin" cleaning), wiping or blowing, etc., including combinations thereof).

5. The method of claim 1, wherein said distortions in said simulated object include distortions arising from mass loss shrinkage, sagging, and/or stress relaxation during baking of a stereolithographically produced intermediate object during said additive manufacturing process.

6. The method of claim 1, wherein the Multiphysics model simulation comprises a discretized Multiphysics model simulation.

7. The method of claim 6, wherein said discretized Multiphysics model simulation comprises a finite element analysis, finite volume analysis, or finite difference analysis Multiphysics model simulation.

8. The method of claim 1, wherein said dual cure resin comprises (i) a light polymerizable first component, and (ii) a second solidifiable component that is different from said first component.

9. The method of claim 8, wherein: said second component comprises precursors to a polyurethane, polyurea, or copolymer thereof, a silicone resin, an epoxy resin, a cyanate ester resin, or a natural rubber.

10. The method of claim 8, wherein said physical object comprises a polymer blend, interpenetrating polymer network, semi-interpenetrating polymer network, or sequential interpenetrating polymer network formed from said first component and said second component.

11. The method of claim 1, wherein said dual cure additive manufacturing process comprises: (i) a light polymerization step; (ii) an optional cleaning step, and then (iii) a further curing step.

12. The method of claim 1, said first input geometry and said candidate input geometry each comprise a three dimensional printable file format.

13. A method of making a physical object having a desired geometry from a dual cure resin by a dual cure additive manufacturing process, the method comprising:
   (a) entering into a processor a first input geometry for the physical object, the first input geometry corresponding to a desired geometry for said physical object;
   (b) generating in the processor a candidate input geometry that is distorted inversely to distortions from the desired geometry caused by the additive manufacturing process for the physical object;
   (c) generating a simulated object from the candidate input geometry with a Multiphysics model simulation of said additive manufacturing process, the simulated object including distortions towards the desired geometry arising from the additive manufacturing process;
   (d) evaluating in the processor, whether said simulated object sufficiently corresponds to the desired geometry for said physical object based on a user assessment and/or a minimum threshold of a function configured to measure a difference between said simulated object and said desired geometry;
   (e) repeating steps (c) through (d) with new candidate input geometries that are distorted inversely to distortions from the desired geometry caused by the additive manufacturing process and generated from either said first input geometry or a previous candidate input geometry until an input geometry that generates a simulated object that sufficiently corresponds to the desired geometry is found and selected; and then
   (f) producing the physical object from said dual cure resin by said dual cure additive manufacturing process with the selected one of the new input geometries, said physical object having reduced distortions from the desired geometry as compared to those distortions found in a physical object produced from the same dual cure resin by the same dual cure additive manufacturing process with said first input geometry.

14. The method of claim 13, wherein said distortions in said simulated object include distortion arising from stress variations and/or temperature variations during stereolithographic production of said intermediate object during said additive manufacturing process.

15. The method of claim 13, wherein said distortions in said simulated object include distortions arising from mass loss shrinkage, sagging, stress variations, temperature variations, and/or stress relaxation during cleaning of a stereolithographically produced intermediate object during said additive manufacturing process.

16. The method of claim 13, wherein said distortions in said simulated object include distortions arising from mass loss shrinkage, sagging, and/or stress relaxation during baking of a stereolithographically produced intermediate object during said additive manufacturing process.

17. The method of claim 13, wherein the Multiphysics model simulation comprises a discretized Multiphysics model simulation.

18. The method of claim 17, wherein said discretized Multiphysics model simulation comprises a finite element analysis, finite volume analysis, or finite difference analysis Multiphysics model simulation.

19. The method of claim 13, wherein said dual cure resin comprises (i) a light polymerizable first component, and (ii) a second solidifiable component that is different from said first component.

20. The method of claim 19, wherein: said second component comprises precursors to a polyurethane, polyurea, or copolymer thereof, a silicone resin, an epoxy resin, a cyanate ester resin, or a natural rubber.

21. The method of claim 19, wherein said physical object comprises a polymer blend, interpenetrating polymer network, semi-interpenetrating polymer network, or sequential interpenetrating polymer network formed from said first component and said second component.

22. The method of claim 13, wherein said dual cure additive manufacturing process comprises: (i) a light polymerization step; (ii) an optional cleaning step, and then (iii) a further curing step.

23. The method of claim 13, wherein the first input geometry and said inversely distorted input geometry each comprise a three dimensional printable file format.

* * * * *